Dec. 14, 1954 H. L. BOWDITCH 2,696,833
PNEUMATIC SYSTEM TRANSFER SWITCH FOR MEASURING INSTRUMENTS
Filed Sept. 9, 1952 5 Sheets-Sheet 1
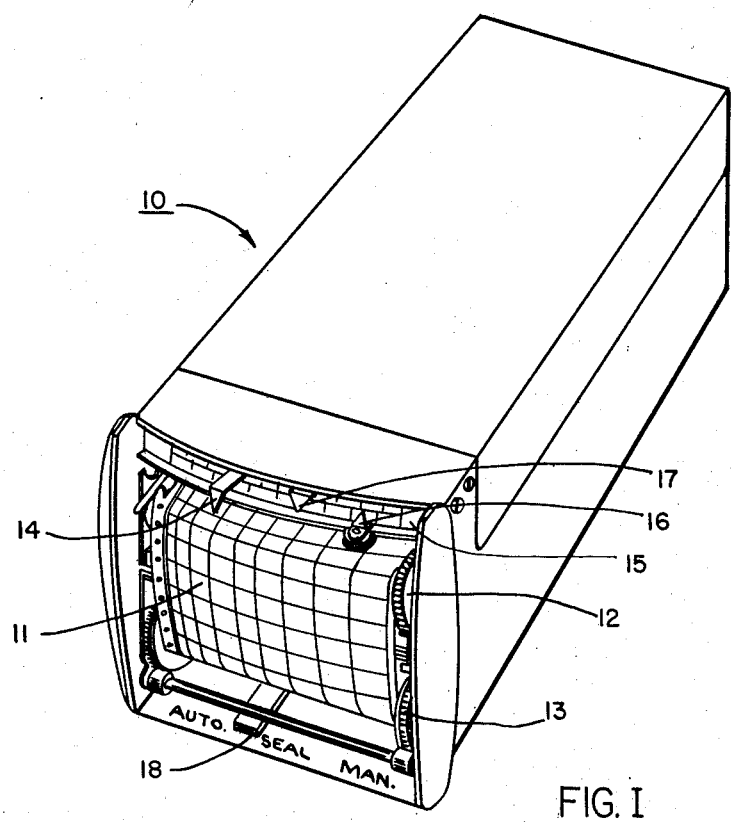
FIG. I
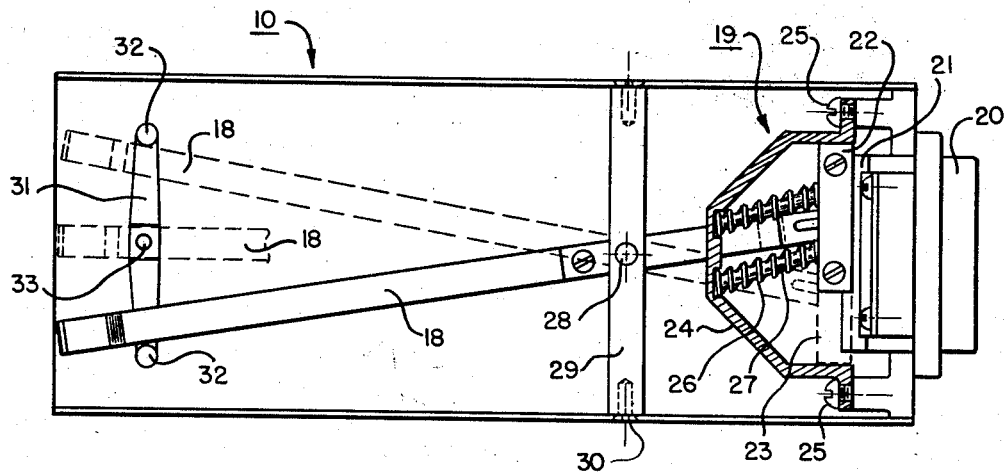
FIG. II
INVENTOR.
HOEL L. BOWDITCH
BY
Curtis, Morris & Safford
ATTORNEYS Dec. 14, 1954  H. L. BOWDITCH  2,696,833
PNEUMATIC SYSTEM TRANSFER SWITCH FOR MEASURING INSTRUMENTS
Filed Sept. 9, 1952  5 Sheets-Sheet 2
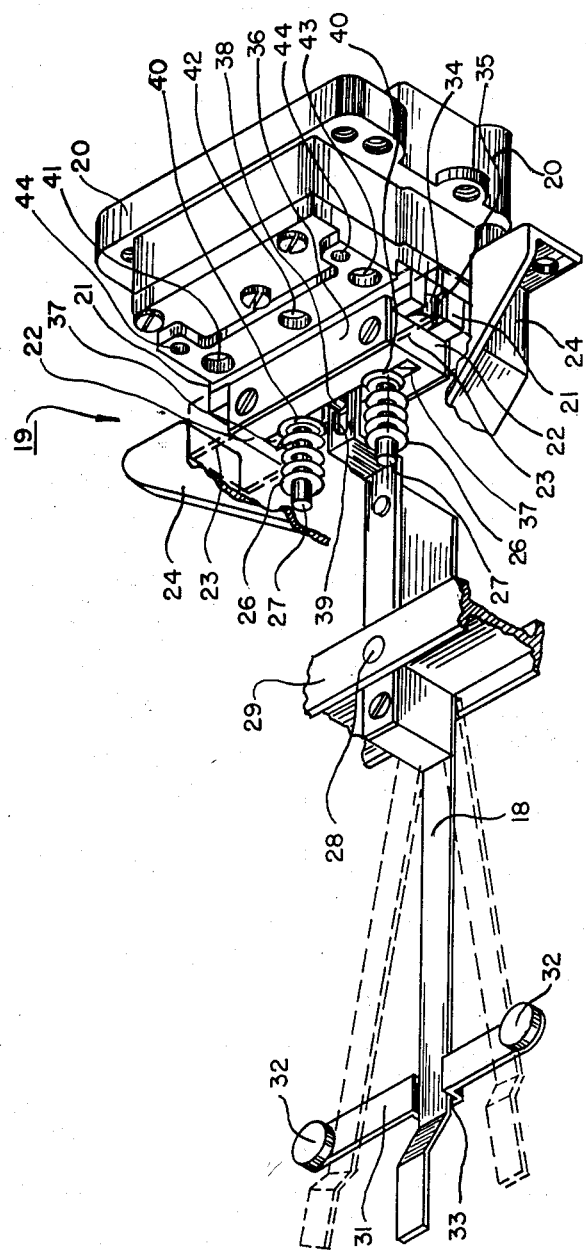
FIG. III
INVENTOR.
HOEL L. BOWDITCH
BY
Curtis, Morris & Safford
ATTORNEYS

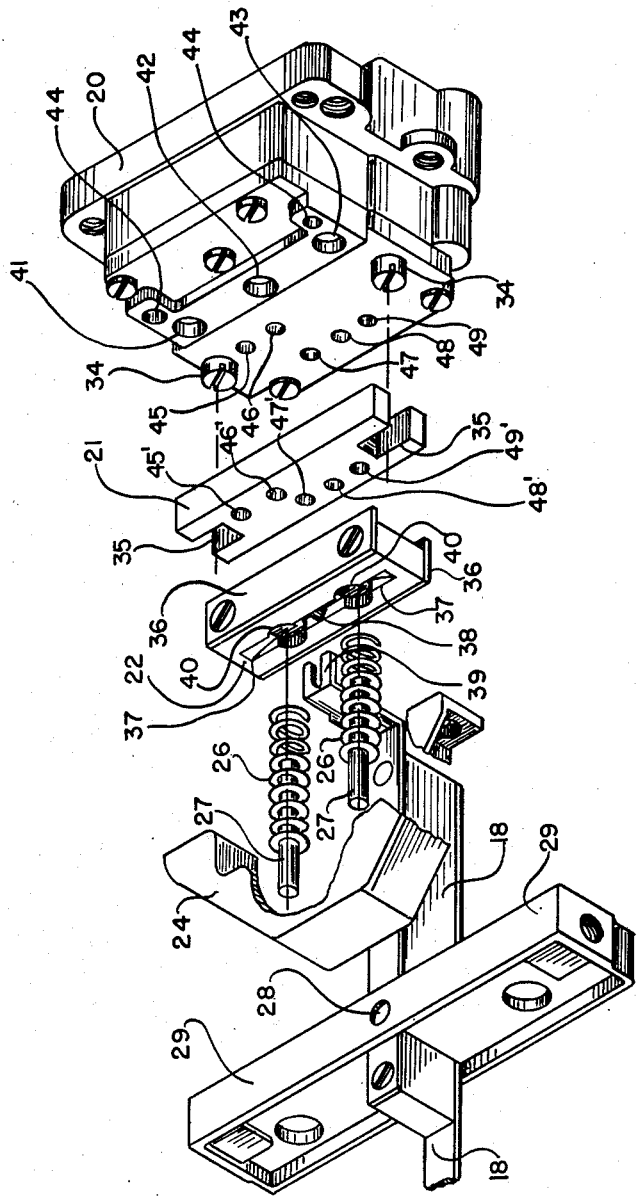

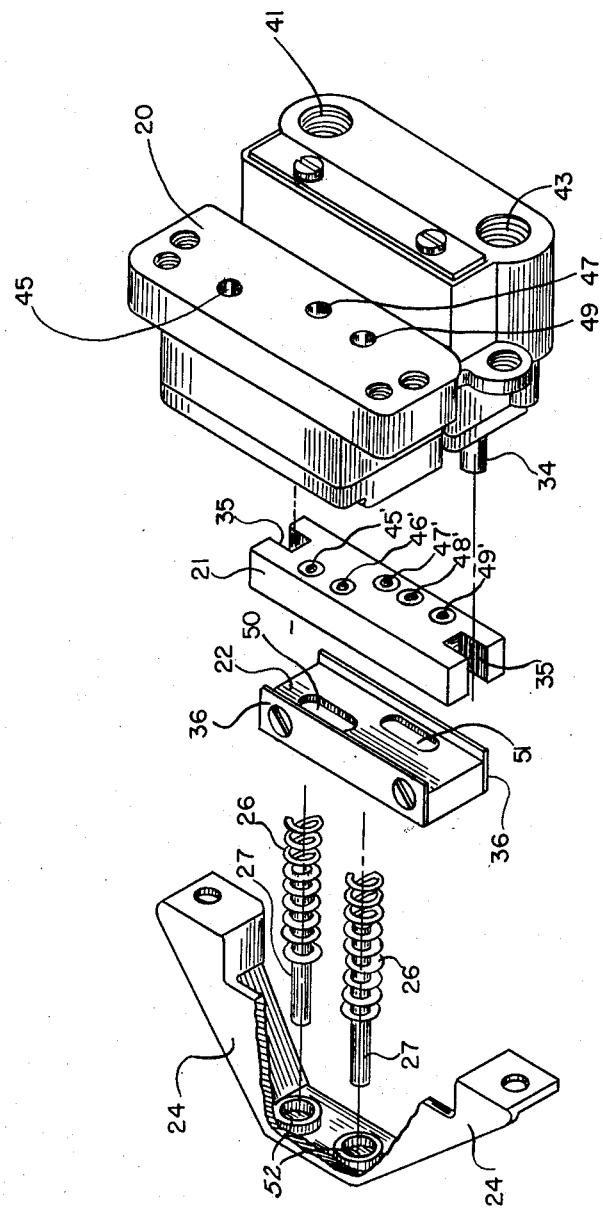

Dec. 14, 1954  H. L. BOWDITCH  2,696,833
PNEUMATIC SYSTEM TRANSFER SWITCH FOR MEASURING INSTRUMENTS
Filed Sept. 9, 1952  5 Sheets-Sheet 5
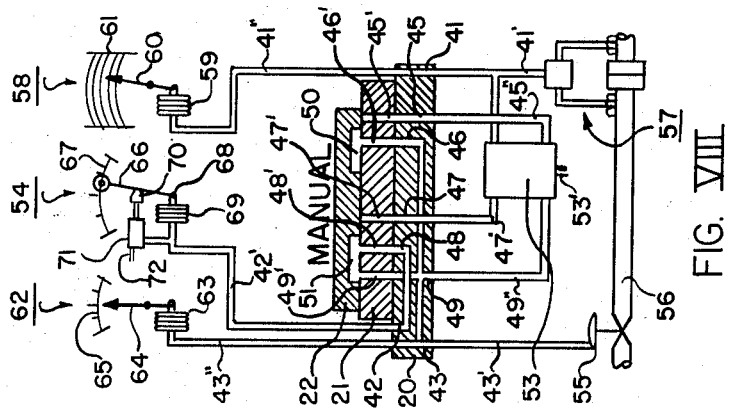
FIG. VIII
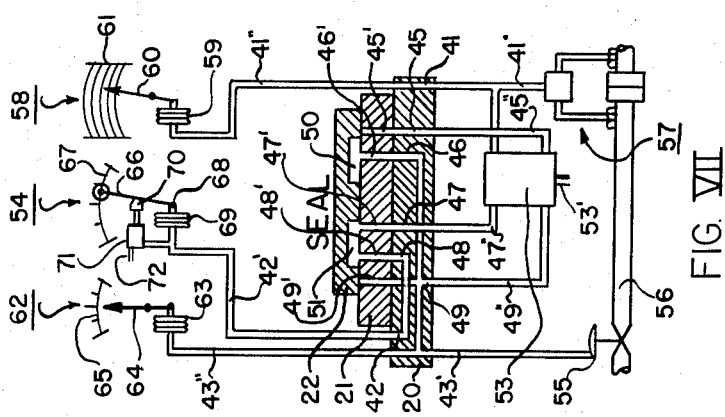
FIG. VII
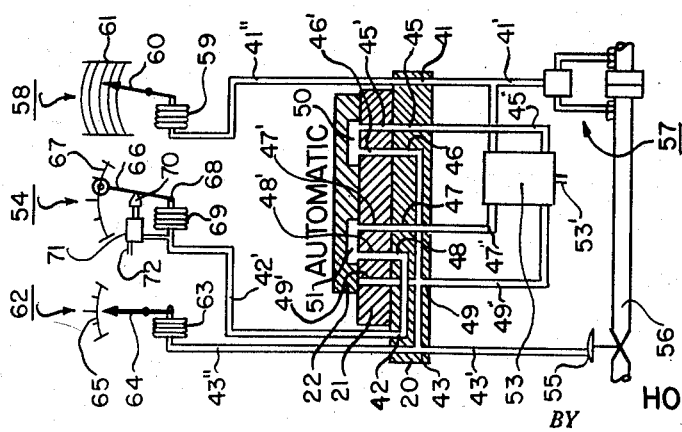
FIG. VI
INVENTOR.
HOEL L. BOWDITCH
BY
*Curtis, Morris + Safford*
ATTORNEYS

United States Patent Office 2,696,833
Patented Dec. 14, 1954

2,696,833

PNEUMATIC SYSTEM TRANSFER SWITCH FOR MEASURING INSTRUMENTS

Hoel L. Bowditch, Foxboro, Mass., assignor to The Foxboro Company, Foxboro, Mass., a corporation of Massachusetts Application September 9, 1952, Serial No. 308,680

1 Claim. (Cl. 137—625.12)

This invention relates to measuring instruments of the type incorporating a system of pneumatic pipes and wherein changes in the value of the variable condition under measurement produce corresponding responses in the pneumatic system, which in turn produce functions such as indication, recording and control, and has particular reference to a transfer switch for such a pneumatic system.

In measuring instruments of this type, it is often desirable to have transfer switches which may be operated to interconnect different portions of the pneumatic system during different operating conditions of the instrument.

Such a transfer switch arrangement is particularly useful where the controlled unit is remote from the instrument. An example of such an arrangement may be considered, for instance, in a control instrument. Such an instrument may be used in association with a valve which is controlled thereby, and the instrument may have an automatic control unit which is responsive to changes in the value of a variable condition, and a manual control unit such as a control set point arrangement, both being in association with the valve.

In the ordinary course of operation of the control instrument, the valve operation is governed by the automatic control unit as guided by the adjustment of the set point manual control. However, it is desirable at times to cut off the valve from the automatic control unit and make the valve responsive solely to changes in the adjustment of the manual control. With the valve under control of the manual control, various adjustments, repairs, or replacements may be made in the instrument without affecting the valve; or various settings of the valve may be made without affecting the automatic control unit. These transitions are accomplished through the use of a transfer switch arranged in the pneumatic system of the instrument. In making this transition from automatic control to manual control, it is desirable to avoid sudden changes in the operation of the valve unit, sometimes called pneumatic "bumps," which may disturb the whole industrial process being regulated by the valve. Therefore, in this transition, an arrangement is provided wherein the valve is cut off from both the automatic control unit and the manual control unit. That is, the valve is locked in whatever position it happened to hold at the time the transition was started. This locking of the valve is obtained by a pneumatic pressure. When the valve is thus locked, various adjustments, repairs, or replacements also may be made in the instrument without affecting the valve. Further, with the valve locked, the manual control set point unit may be adjusted in order to make the transition without "bump." In the transition from automatic to manual control, the set point pneumatic pressure is thus matched with the valve pressure, which may be the automatic control unit output pressure, and in the transition from manual to automatic control, the set point pneumatic pressure is thus matched with the automatic control unit input pressure.

Various difficulties have been encountered in the past in connection with transfer switches of this general nature and application. The transitions involve connecting and disconnecting pneumatic pipes or passages and it has been found difficult to do this simply and effectively without pneumatic leakage.

It is an object of this invention to provide a new and improved transfer switch for measuring instrument pneumatic systems.

It is a further object to provide a simple and effective nonleaking transfer switch for measuring instrument pneumatic systems.

These and other objects of this invention will be in part pointed out and will be in part apparent from the following description, and from the accompanying drawings, in which:

Figure I is a perspective view of a measuring instrument unit embodying this invention;

Figure II is a plan view of the instrument of Figure I, with all portions removed except the transfer switch;

Figure III is a perspective view, in assembly, of the transfer switch of Figure II, removed from the instrument;

Figure IV is an exploded, perspective view of the greater part of the switch assembly of Figure III, presenting one side of the various parts thereof;

Figure V is another exploded, perspective view of a large part of the switch assembly of Figure III, presenting the opposite side of the various parts thereof, with reference to Figure IV;

Figure VI is a schematic illustration of a pneumatic system and transfer switch in an embodiment of this invention, with the switch in "automatic" position;

Figure VII is a schematic illustration of the system and switch of Figure VI, with the switch in "seal" position; and Figure VIII is a schematic illustration of the system and switch of Figures VI and VII, with the switch in "manual" position.

Referring to Figure I, this invention is embodied, as an illustrative application, in a strip chart recording instrument 10.

This instrument is designed with substantial depth as a means of providing a relatively small frontal area in the instrument and to make the instrument suitable for multi-instrument panel arrangements.

Figure I shows a perspective view of the instrument as a whole and certain details at the front, including a strip chart 11 mounted on a pair of rolls 12 and 13 for driven movement past a pen 14. The pen 14 is movable across the chart in response to changes in the value of a variable condition. A double scale block 15 is provided above the chart 11. A manually adjustable index arm 16 is associated with one of the scales on the block 15 as a control set point adjustment member, and an index arm 17 is associated with the other of the scales on the block 15 for movement therealong in response to some factor in relation to the variable condition, for example, valve position in a flow control arrangement.

Below the chart 11, and extending rearwardly into the instrument, a lever 18 is provided as a transfer switch operating member.

In Figure II, a transfer switch 19 is shown within the instrument 10 with the other parts of the instrument removed to provide a clear view of the switch. The details of the pneumatic connections will be described hereinafter. The switch 19 comprises, generally, a base block 20, mounted on the rear wall of the instrument, an intermediate block 21 mounted on the front of base block in a fixed position and non-rigid arrangement which will be explained later herein, and a transfer block 22 mounted in laterally slidable straight line movement arrangement on the intermediate block 21. The path of movement of the transfer block is generally indicated by a dotted line 23. A forwardly and horizontally arching support member 24 is mounted on the rear wall of the instrument by bolts 25, and is in general horizontal alignment with the transfer block 22. The various blocks are held in assembly with each other by a pair of coil springs 26, each of which has one end based on the rear face of the arch support 24 and the other end based on the transfer block 22. These springs lie parallel to each other, and in the central position of the transfer block, they lie perpendicular to the transfer block. The transfer block ends of the springs 26 move with the transfer block and are provided with support pins 27 within the coils of the springs 26 and extending longitudinally thereof. The pins 27 prevent buckling of the springs 26 and are made sufficiently long for this purpose without being so long as to interfere with the movement of the transfer block.

The transfer switch operating lever 18 is mounted for horizontal movement on a pivot 28, centrally located in a support bar 29 which extends transversely of the instrument and is fixedly located forwardly therein with respect to the transfer switch 19 by screws 30 set in the side walls of the instrument 10. The rearward end of the switch lever 18 operatively engages the transfer block 22 with the result that movement of the lever 18 about its pivot 28, as is usually accomplished manually at the front of the instrument, produces lateral sliding movement of the transfer block in a toggle action arrangement with the springs 26.

The transfer switch 19 has three operating positions as illustrated in Figures VI, VII, and VIII, and these positions are definitely arrived at and held by the use of stop arrangements, with and without the aid of the springs 26. Referring to Figure II, for example, the lateral movement of the transfer block 22 is terminated at each side of the transfer switch by the engagement of the transfer block with end portions of the arched support member 24 and the transfer block is held at each of these positions by the springs 26 which in each case are moved to a position in which they bias the transfer block 22 against the support member 24. Further transfer block position locating means is provided at the front of the instrument in the form of a crossbar 31 which is fixed to the bottom of the instrument and extends transversely thereof, with the switch lever 18 riding on the crossbar. Each end of the crossbar 31 is provided with a stop 32 against which the switch lever 18 abuts, and a laterally central recess 33 is provided in the crossbar to receive the switch lever and to hold it in a central position as a means of locating the transfer block 22 in a laterally central position.

In Figure III, the various parts of the switch structure of Figure II are shown in greater detail, and the combination of the switch lever 18 and the transfer block 22 is shown in the central position. In addition, the base block 20 is shown to be provided with forwardly extending mounting pins 34 (see also Figure IV) for assembly in intermediate block end slots 35. The transfer block 22 has top and bottom plates 36 thereon, forming a channel within which the intermediate block 21 is received in assembly. Further, the forward face of the transfer block is provided with a lateral slot 37 wherein a vertical pin 38 is secured for operative engagement with the switch lever 18 by way of an end slot 39 in the rearward end of the lever 18. In the forward face of the transfer block and on each side of the pin 38, cylindrical recesses 40 are provided in enlargement of the slot 37 to receive one end of the spring and pin combinations 26 and 27. In the forward face of the base block 20, three openings 41, 42, and 43 are provided for pneumatic connections. These connections will be explained later herein with reference to Figures VI, VII, and VIII. In order to mount a suitable clamp to hold pneumatic connections in the openings 41, 42, and 43, mounting openings 44 are provided.

In Figure IV the various parts of the switch structure of Figures II and III are shown in somewhat further detail, with the parts separated in an exploded, perspective view. In this view the forward faces of the various parts are shown, with the base block assembly pins 34 shown in alignment for assembly with the intermediate block end slots 35. The base block is provided with pneumatic passage openings 45, 46, 47, 48 and 49, and the intermediate block has aligned pneumatic passage openings 45', 46', 47', 48', and 49'.

In Figure V, certain of the parts of the switch structure are shown in a different perspective than that used in Figure IV. In this view, the rearward faces of the parts are presented. Certain of the base block pneumatic passages open to the rearward face of the base block, as at 41, 43, 45, 47, and 49. Also, the intermediate block pneumatic passages open to the rearward face of the intermediate block as at 45', 46', 47', 48', and 49'. In each of these intermediate block passages, resilient O rings are mounted in countersunk portions of the passages at the rearward face of the intermediate block 21. These O rings extend rearwardly beyond the rearward face of the intermediate block 21 and serve to engage the forward face of the base block to provide a resilient assembly and pneumatic seals for the joining of the pneumatic passages of the intermediate block and the base block. The rearward face of the transfer block 22 is provided with horizontally disposed elongated recesses 50 and 51 for connecting the pneumatic passages of the intermediate block 21 in different relations at different positions of the transfer block 22. The arched support 24, on its rearward face and in the central portion of the arch, is provided with cups 52 for receiving and anchoring the forward ends of the toggle arrangement of the coil springs 26 and the pins 27.

The general assembly of the base, intermediate, and transfer blocks thus comprises a base block which may be a casting with ordinary surfacing on its forward face, an intermediate block which is non-rigidly mounted on the base block in a pin-and-slot assembly arrangement and which has resilient O rings interposed between itself and the base block on which it is mounted. With this arrangement, changes in base block surface contour due to ageing or heat or cold distortion have no effect on the pneumatic system of the instrument; that is, such action does not open up any pneumatic passages to leakage. The intermediate block 21 is formed of a hardened steel, machineable to a fine surface, and such a surface is provided on the forward face of this block. The general assembly further comprises the transfer block 22, formed of soft metal such as brass, with its rearward face lapped into close fitting engagement with the forward face of the intermediate block 21. With the springs 26 urging the transfer block against the intermediate block and the intermediate block against the base block, a simple, non-rigid, straight line movement transfer switch is provided, in which pneumatic leakage, in practical effect, is eliminated.

Figures VI, VII, and VIII provide schematic illustration of the operation of the pneumatic system transfer switch of this invention. Each of these figures shows representations of the transfer switch base block 20, intermediate block 21, and transfer block 22 in association with an automatic control 53, with a pneumatic power input pipe 53', a manual control unit 54, and a controlled valve unit 55 in a flow pipe 56. A flow sensing unit 57 is also provided in association with the flow pipe 56 in the form of a differential pressure orifice plate arrangement. The transfer block 22 is in a different position on the intermediate block 21 in each of these three figures, to provide respectively, "automatic," "seal," and "manual" arrangements in the pneumatic system.

Referring to Figure VI, the flow sensing unit 57 is connected by a pipe 41' to the automatic control unit 53 and to the base block passage 41, and thereafter by a pipe 41" to a recording unit 58 which is made up of a bellows 59, a pivoted pen 60 operable by the bellows 59 and a chart 61 on which the pen makes a record of the response of the unit 57 to flow in the flow pipe 56. The controlled valve unit 55 is connected by a pipe 43' to the base block passage 43, and thereafter by a pipe 43" to a valve position indicator 62, made up of a bellows 63, a pivoted pointer 64 operable by the bellows 63, and a scale 65 for association with the pointer 64. The manual control unit 54 is a set point arrangement made up of a manually adjustable lever 66 which is movable over a set point scale 67 about a pivot 68 on the movable end of a bellows 69. Adjustment of the lever 66 varies the flow from a pneumatic nozzle 70, and the nozzle back pressure operates a pneumatic relay 71 which is provided with pneumatic power through a supply pipe 72. The relay output pressure is applied to the bellows 69 to readjust the relation between the lever 66 and the nozzle 70 to a balance, and the relay output is also carried by a pipe 42' to the base block passage 42.

The automatic control unit 53 is connected to the base block passage 47 by a pipe 47" as a set point conduit, to the base block passage 49 by a pipe 49" as a control feedback conduit, and to the base block passage 45 by a pipe 45" as an automatic control unit output conduit. In this "automatic" position, shown in Figure VI, the transfer block recess 50 connects intermediate block passages 45' and 46' and the transfer block recess 51 connects intermediate block passages 47' and 48'. The automatic control unit 53 acts in response to pressure in pipe 41' to produce an output pressure in pipe 45" which is applied, through passages 45, and 45', recess 50, passages 46' and 46, and pipe 43', to the controlled valve unit 55 and the valve position indicator unit 62. The automatic control unit 53 has a feedback pressure applied thereto from pipe 46 in its output line, through the feedback pipe 49″. Also, a set point pressure from the set point manual control unit is applied to the automatic control unit 53 through pipe 42′, base block passages 42 and 48, intermediate block passage 48′, transfer block recess 51, intermediate block passage 47′, base block passage 47, and pipe 47″.

In the "automatic" arrangement of Figure VI therefore, the automatic control unit 53, the manual control unit 54, and the controlled valve unit 55 are all operatively connected, and the valve responds to automatic control.

In the "seal" arrangement of Figure VII, the transfer block 22 has been moved to the left as viewed in the drawing, to its central position, wherein the transfer block recess 50 no longer connects the intermediate block passages 45′ and 46′, and the transfer block recess 51 still connects the intermediate block passages 47′ and 48′. The result of this arrangement is that the output of the automatic control unit is dead ended in the intermediate block passage 45′ against the transfer block 22. It follows that the manual set point unit 54, although still connected to the automatic control unit 53, has no effect on the controlled valve unit 55, and the unit 55 is pneumatically isolated.

In the "manual" arrangement of Figure VIII, the transfer block 22 has been moved further to the left. The transfer block recess 50 still is open to the intermediate block passage 46′ only, and the automatic control unit output is still dead ended against the transfer block 22. However, the transfer block recess 51 now connects the intermediate block passages 49′ and 48′, and thus completes a connection from the set point unit 54 to the controlled valve unit 55. Although the set point unit 54 is also connected to the automatic control unit 53, the output of the unit 53 is dead ended. Therefore, in this arrangement, the valve unit 55 responds to adjustment of the manual control unit 54, and does not respond to the automatic control unit 53.

This invention, therefore, provides a new and novel measurement instrument pneumatic system transfer switch wherein switching is accomplished by straight line sliding movement in a simple structure, without pneumatic leakage.

As many embodiments may be made in the above invention, and as many changes may be made in the embodiment above described without departing from the spirit and scope of the invention as described herein and shown in the accompanying drawings, it is to be understood that all matter hereinbefore set forth or shown in the accompanying drawings is to be interpreted as illustrative only and not in a limiting sense.

I claim:

For use in a measuring instrument having a network of pneumatic system pipes therein, a transfer switch for said pneumatic system comprising, in combination, a base-block having a series of openings therein, a pair of mounting pins secured to said base-block, an intermediate block having end slots therein cooperating with said pins to mount said intermediate block on said base-block with freedom of movement of said intermediate block toward and away from said base-block, said intermediate block having openings therethrough in alignment with said base-block openings to form continuous passages therewith, a transfer block, a pair of guide plates secured to said transfer block and extending outwardly therefrom to receive said intermediate block and to slidably mount said transfer block on said intermediate block in covering relation with and for switching movement with respect to said passages, said transfer block having at least one recess for connecting said passages in different relations at different positions of said transfer block, said transfer block, further, having a lever connection pin mounted thereon and a pair of spring terminal openings therein, and a toggle assembly for holding said blocks together and for producing said switching movement of said transfer block, said toggle assembly comprising an arching support secured to said base-block and extending outwardly about said intermediate and transfer blocks, a pair of coil springs each having one end based on said support and the other end based in one of said transfer block spring terminal openings, a separately and pivotally mounted lever having a slotted end receiving said transfer block lever connection pin, and lever positioning means for holding said lever at each of several positions of adjustment about said lever pivot to provide said different positions of said transfer block.

References Cited in the file of this patent
UNITED STATES PATENTS

| Number | Name | Date |
|---|---|---|
| 1,409,563 | Maxwell | Mar. 14, 1922 |
| 2,311,853 | Moore | Feb. 23, 1943 |
| 2,427,755 | Wedeberg | Sept. 23, 1947 |
| 2,503,881 | Manis | Apr. 11, 1950 |
| 2,507,607 | McLeod | May 16, 1950 |
| 2,594,136 | Di Maggio, Jr. | Apr. 22, 1952 |